United States Patent
Ak et al.

(10) Patent No.: US 10,057,536 B2
(45) Date of Patent: Aug. 21, 2018

(54) VIDEO RECORDING DEVICE

(71) Applicant: ARCELIK ANONIM SIRKETI, Istanbul (TR)

(72) Inventors: Ayhan Ak, Istanbul (TR); Mustafa Ozgur Baydarol, Istanbul (TR); Ali Haktan Isilak, Istanbul (TR); Engin Mercan, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 65 days.

(21) Appl. No.: 14/758,794

(22) PCT Filed: Dec. 30, 2013

(86) PCT No.: PCT/EP2013/078103
§ 371 (c)(1),
(2) Date: Jun. 30, 2015

(87) PCT Pub. No.: WO2014/102360
PCT Pub. Date: Jul. 3, 2014

(65) Prior Publication Data
US 2015/0341589 A1    Nov. 26, 2015

(30) Foreign Application Priority Data
Dec. 31, 2012 (TR) ................ a 2012 15789

(51) Int. Cl.
*H04N 5/775* (2006.01)
*H04N 5/765* (2006.01)
(Continued)

(52) U.S. Cl.
CPC ............ *H04N 5/775* (2013.01); *H04N 5/765* (2013.01); *H04N 21/4312* (2013.01);
(Continued)

(58) Field of Classification Search
USPC ............... 386/200–234, 239–248, 291–299
See application file for complete search history.

(56) References Cited

U.S. PATENT DOCUMENTS 4,841,367 A    6/1989   Ichikawa et al.
7,327,931 B2   2/2008   Frantz
(Continued)

FOREIGN PATENT DOCUMENTS

CN    1744690 A     3/2006
CN    200983643 Y   11/2007
(Continued)

OTHER PUBLICATIONS

International Search Report and written opinion for WO2014/102360 A1 & References Cited Therein.

*Primary Examiner* — Hung Dang
(74) *Attorney, Agent, or Firm* — Kilpatrick Townsend & Stockton LLP

(57) ABSTRACT

The present invention relates to a video recording device (1) comprising at least one receiver (2) that receives digital broadcast signals that belong to more than one channel, more than one source input (3) that enables external video sources (S1, S2) to be connected, an interface unit (4) that enables a source list (L), where the receivers (2) and the source inputs (3) are listed, to be displayed for the user by means of a display (D), a recording unit (5) that enables the digital broadcast signal received by means of the receiver (2) to be recorded, a memory (6) wherein the recorded content is stored, and a control unit (7) that allows that at least some of the external video sources (S1, S2) connected to the source inputs (3) can be switched to while the recording unit (5) continues the recording process.

17 Claims, 2 Drawing Sheets

Figure 1:
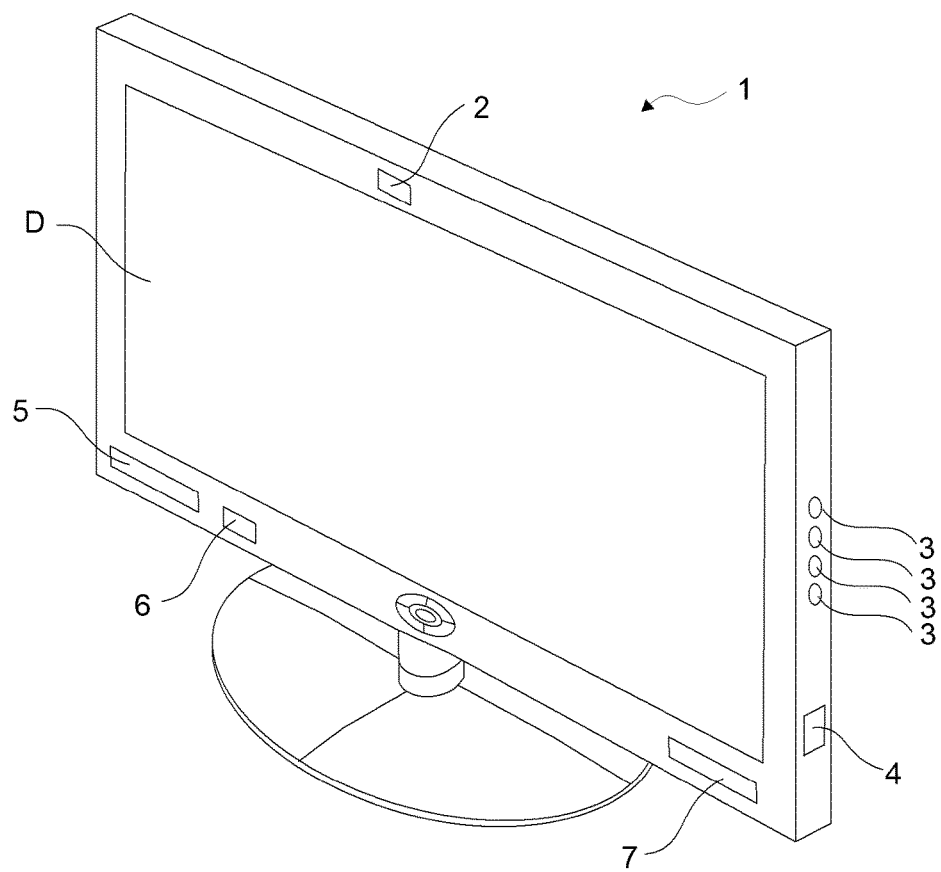

(51) Int. Cl.
*H04N 21/431* (2011.01)
*H04N 21/433* (2011.01)
*H04N 21/4363* (2011.01)
*H04N 21/485* (2011.01)
*H04N 21/488* (2011.01)
*H04N 5/76* (2006.01)

(52) U.S. Cl.
CPC ... *H04N 21/4334* (2013.01); *H04N 21/43632* (2013.01); *H04N 21/485* (2013.01); *H04N 21/4882* (2013.01); *H04N 5/76* (2013.01)

(56) References Cited

U.S. PATENT DOCUMENTS

| | | | |
|---|---|---|---|
| 7,636,509 B2 * | 12/2009 | Davis | H04N 21/4332 386/239 |
| 7,904,921 B2 | 3/2011 | Yun et al. | |
| 7,924,817 B2 | 4/2011 | Ohno et al. | |
| 2003/0037335 A1 | 2/2003 | Gatto et al. | |
| 2006/0026637 A1 | 2/2006 | Gatto et al. | |
| 2006/0164561 A1 | 7/2006 | Lacy et al. | |
| 2007/0079340 A1 * | 4/2007 | McEnroe | H04N 7/163 725/78 |
| 2007/0143814 A1 | 6/2007 | Han | |
| 2008/0034391 A1 * | 2/2008 | Lehman | H04H 20/63 725/59 |
| 2008/0059884 A1 * | 3/2008 | Ellis | H04N 5/44543 715/721 |
| 2008/0080835 A1 | 4/2008 | Hutten | |
| 2010/0014834 A1 * | 1/2010 | Flynn | H04N 5/782 386/200 |
| 2011/0162020 A1 * | 6/2011 | Kahn | H04N 21/4263 725/82 |
| 2011/0261265 A1 | 10/2011 | Zhao | |
| 2011/0265112 A1 * | 10/2011 | Kwak | G09G 5/006 725/25 |
| 2011/0311195 A1 | 12/2011 | Ikeda et al. | |
| 2012/0141096 A1 | 6/2012 | Ellis et al. | |
| 2012/0151357 A1 * | 6/2012 | Roche | G06F 3/0481 715/736 |
| 2014/0153904 A1 * | 6/2014 | Adimatyam | H04N 5/76 386/248 |

FOREIGN PATENT DOCUMENTS

| | | |
|---|---|---|
| CN | 101242501 A | 8/2008 |
| CN | 201577137 U | 9/2010 |
| CN | 102223578 A | 10/2011 |
| CN | 202363105 U | 8/2012 |
| DE | 3621364 A1 | 1/1988 |
| DE | 4302717 A1 | 8/1993 |
| DE | 3724973 C2 | 8/1996 |
| EP | 1115256 A1 | 7/2001 |
| EP | 1725029 A1 | 11/2006 |
| EP | 2191643 A4 | 10/2010 |
| JP | H066690 A | 1/1994 |
| JP | 2004241852 A | 8/2004 |
| JP | 4592030 B2 | 12/2010 |
| JP | 2011071725 A | 4/2011 |
| KR | 20060041446 A | 5/2006 |
| KR | 20070024996 A | 3/2007 |
| KR | 20070066135 A | 6/2007 |
| KR | 20100047136 A | 5/2010 |
| WO | 9960784 A1 | 11/1999 |
| WO | 0199436 A2 | 12/2001 |
| WO | 03017079 A1 | 2/2003 |
| WO | 2004029750 A2 | 4/2004 |
| WO | 2005/048595 A1 | 5/2005 |
| WO | 2009039446 A1 | 3/2009 |
| WO | 2010076268 A1 | 7/2010 |

\* cited by examiner

VIDEO RECORDING DEVICE

The present invention relates to a video recording device.

In video recording devices, while the broadcast signal received by means of the digital receiver is recorded, depending on the processor and memory utilization, some of the external video sources connected to source inputs such as HDMI, Scart, VGA, USB, etc. cannot be switched to or can be only switched to after the recording process is stopped. Since the user does not know to which external video sources can be switched to without stopping the recording process, it becomes difficult for him/her to determine the appropriate video sources when an external video source is desired to be switched to during recording. The user may accidentally stop the recording while searching for an external video source that can be switched to without stopping the recording process and may cause the loss of the recorded image. In some video recording devices, a greater number of or more powerful processors are used in order to solve this problem; however, this causes increase in production costs.

In the state of the art European Patent Application No. EP 1115256, a digital video recorder is disclosed, having an analog source and at least one digital source. In this embodiment, an encoder that encodes the analog source and a multiplexer that is connected to the encoder and the digital source are used.

The aim of the present invention is the realization of a video recording device wherein switching to the external video sources connected to the source inputs during the recording process is facilitated.

The video recording device realized in order to attain the aim of the present invention, explicated in the first claim and the respective claims thereof, comprises a control unit enabling the external video sources, that can be switched to without stopping the recording process, to be displayed discernibly from other external video sources beginning from the moment the digital broadcast signal is started to be recorded. Thus, the user can easily see the channels he/she can switch to in the source list and switching between all the sources is not required.

In an embodiment of the present invention, when the user desires to change the source while the recording process continues, he/she can switch only between the external video sources that can be switched without stopping the recording process. Thus, the user is prevented from unintentionally stopping the recording by switching to an external video source that cannot be switched to without stopping the recording process.

In an embodiment of the present invention, when the user switches between the external video sources that can be switched without stopping the recording process while the recording process continues, a message is displayed that the other sources cannot be switched to due to the recording process. Thus, the user is prevented from switching to the other sources forgetting that the recording process is being performed.

In another embodiment of the present invention, while the recording process continues, the external video sources that cannot be switched to without stopping the recording process can be also switched to. However before switching, the user is reminded that recording will be stopped in case the user performs the switching process and the user is asked for approval. If the user approves the process, the recording is stopped and the limitations in the source circulation are eliminated.

In an embodiment of the present invention, when the source list is displayed during the recording process, the control unit enables an icon to be displayed next to the receiver indicating that the recording process continues. Thus, at every source switching the user is reminded that the recording process continues.

In an embodiment of the present invention, the external video sources that can be switched to without stopping the recording process are listed one after the other at the top of the source list. Thus, the user does not need to look at the different parts of the list in order to find the external video sources he/she can switch to and can see them collectively at the top of the source list. This provides ease of utilization.

In an embodiment of the present invention, when the source list is opened while the recording process continues, the external video sources that can be switched to without stopping the recording process are displayed with a color different from that of the other sources. Thus, the user is enabled to find the sources he/she can switch to on the channel list more quickly while the recording process continues.

In an embodiment of the present invention, when the source list is opened while the recording process continues, the external video sources that can be switched to without stopping the recording process are displayed with a font and/or size different from that of the other sources. In this embodiment, the sources that the user can switch to while the recording process continues are displayed bolder, larger, underlined or in italics with respect to other sources.

In an embodiment of the present invention, the control unit assures that the source inputs to which no external video source is connected are displayed on the source list so as to be visually discernible from the source inputs to which an external video source is connected. Thus, only the external video sources, that are connected and that can be switched to without stopping the recording process, are easily determined.

In an embodiment of the present invention, while the recording process continues, the control unit allows that only the external video sources which are AV sources can be switched to.

In different embodiments of the present invention, the video recording device is a digital television or a set-top box (STB).

By means of the present invention, the source switching process is enabled to be easily performed while the recording process is performed. Moreover, the risk of the recording process being unintentionally stopped is eliminated.

The video recording device realized in order to attain the aim of the present invention is illustrated in the attached figures, where:

FIG. 1—is the schematic view of a video recording device.

Figure 2:
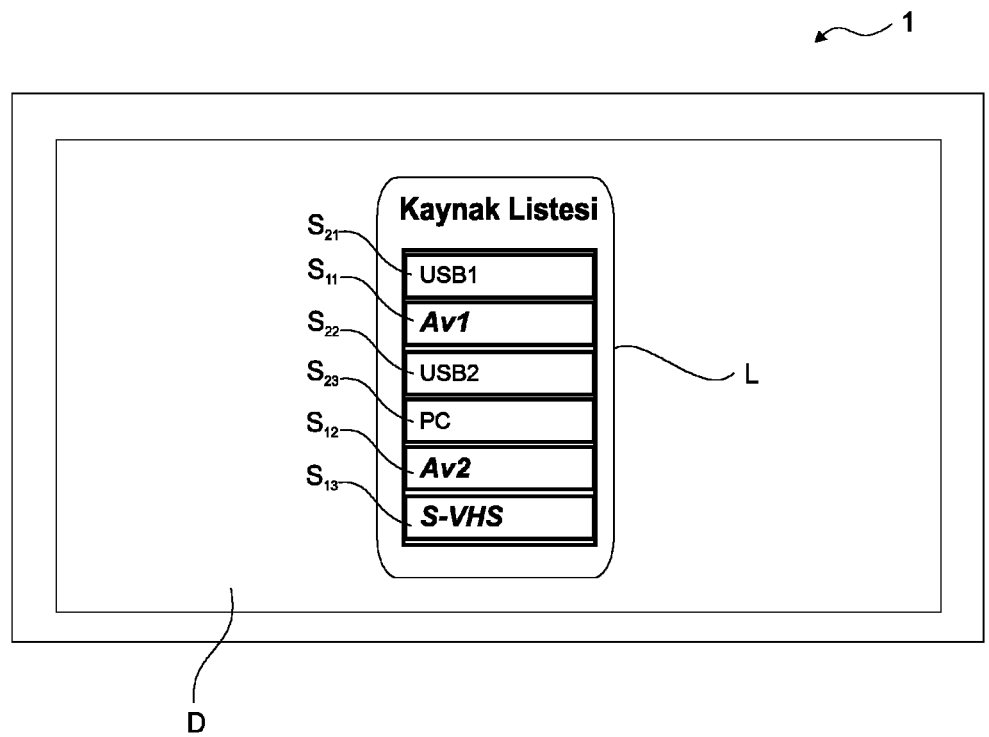

FIG. 2—is the view of the source list related to an embodiment of the present invention.

Figure 3:
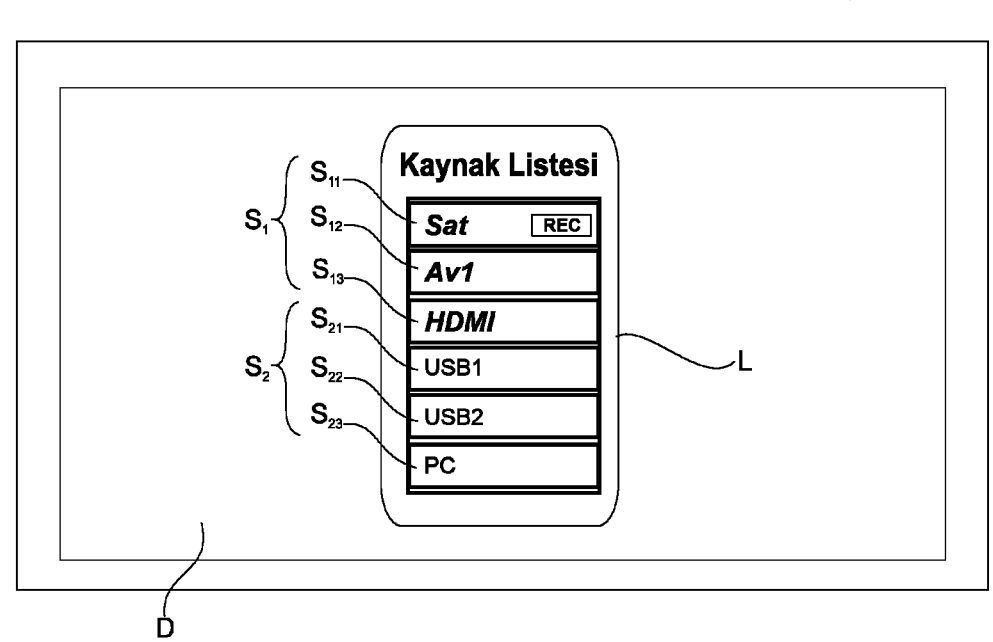

FIG. 3—is the view of the source list related to another embodiment of the present invention.

1. Video recording device
  2. Receiver
  3. Source input
  4. Interface unit
  5. Recording unit
  6. Memory
  7. Control unit The video recording device (1) comprises at least one receiver (2) that receives digital broadcast signals that belong to more than one channel, more than one source input (3) that enables external video sources [S1(S11, S21, S31), S2(S21, S22, S23)] to be connected, an interface unit (4) that enables a source list (L), where the receivers (2) and the source inputs (3) are listed, to be displayed for the user by means of a display (D), a recording unit (5) that enables the digital broadcast signal received by means of the receiver (2) to be recorded, a memory (6) wherein the recorded content is stored, and a control unit (7) that allows that at least some of the external vide sources (S1, S2) connected to the source inputs (3) can be switched to while the recording unit (5) continues the recording process. The recording unit (5) is activated by user command and the digital broadcast signal received by means of the receiver (2) is started to be recorded on the memory (6). When the user desires to operate an external video source (S1, S2) connected to a source input (3) such as HDMI, Scart, VGA; USB, etc. while the recording process continues, the control unit (7) calculates the process and memory sources used due to the recording process and allows the switching without stopping the recording depending on the type of the external video source (S1, S2) desired to be switched to.

In the video recording device (1) of the present invention, when the source list (L) is displayed while the recording process continues, the control unit (7) enables the external video sources (S11, S12, S13, . . . ) that can be switched to without stopping the recording process to be displayed so as to be visually discernible from the external video sources (S21, S22, S23, . . . ) that cannot be switched to without stopping the recording process. Thus, the user is not required to try all external video sources (S1, S2) one by one in order to determine the external video sources (S11, S12, S13, . . . ) that can be switched to without stopping the recording process. This provides ease of utilization and saving on time.

In an embodiment of the present invention, when an external video source (S1, S2) is desired to be switched to while the recording process continues, the control unit (7) allows that only the external video sources (S11, S12, S13, . . . ), that can be switched to without stopping the recording process, are switched to. Thus, the user is prevented from stopping the recording process by switching to an external video source (S21, S22, S23, . . . ) that cannot be switched to without stopping the recording process. Thus, the user is required to stop the recording process first in order for him/her to switch to an external video source (S21, S22, S23, . . . ) that cannot be switched to without stopping the recording process.

In an embodiment of the present invention, when an external video source (S11, S12, S13, . . . ) that can be switched to without stopping the recording process is switched to while the recording process continues, the control unit (7) displays a message that the external video sources (S21, S22, S23, . . . ) that cannot be switched to without stopping the recording process cannot be switched to due to the recording process. Hence, the user is prevented from thinking that there is a problem related to the external video sources (S21, S22, S23, . . . ) that cannot be switched to without stopping the recording process by forgetting the on-going recording process.

In another embodiment of the present invention, when an external video source (S21, S22, S23, . . . ) that cannot be switched to without stopping the recording process is desired to be switched to while the recording process continues, the control unit (7) displays a message that the recording process will be stopped if the switching process is continued. Thus, the user is prevented from unintentionally stopping the recording process.

In an embodiment of the present invention, the control unit (7) provides the displaying of a message indicating that the recording process is being performed in the vicinity of the receiver (2) when the source list (L) is displayed while the recording process continues. Hence, when the source list (L) is displayed, it is possible to clearly understand that the signal being received through the receiver (2) is being recorded (FIG. 2, FIG. 3).

In an embodiment of the present invention, when the source list (L) is displayed while the recording process continues, the control unit (7) enables the external video sources (S11, S12, S13, . . . ) that can be switched to without stopping the recording process to be displayed at the top of the source list (L) one after the other such that no other external video source (S21, S22, S23, . . . ) is placed therebetween. Thus, the user easily finds the external video sources (S11, S12, S13, . . . ) that can be switched to without stopping the recording process at the top of the source list (L) without looking for the place thereof in the source list (L). This provides ease of utilization (FIG. 3).

In an embodiment of the present invention, when the source list (L) is displayed while the recording process continues, the control unit (7) enables the external video sources (S11, S12, S13, . . . ) that can be switched to without stopping the recording process to be displayed in the source list (L) in a color different from that of the external video sources (S21, S22, S23, . . . ) that cannot be switched to without stopping the recording process. Thus, the external video sources (S11, S12, S13, . . . ) that can be switched to without stopping the recording process can be easily discerned from the external video sources (S21, S22, S23, . . . ) that cannot be switched to without stopping the recording process.

In an embodiment of the present invention, when the source list (L) is displayed while the recording process continues, the control unit (7) enables the external video sources (S11, S12, S13, . . . ) that can be switched to without stopping the recording process to be displayed in the source list (L) with a font and/or size different from that of the external video sources (S21, S22, S23, . . . ) that cannot be switched to without stopping the recording process. Hence, even the video recording device (1) does not have a colored on-screen menu system, the external video sources (S11, S12, S13, . . . ) that can be switched to without stopping the recording process can be easily discerned (FIG. 2, FIG. 3).

In an embodiment of the present invention, the control unit (7) assures that the source inputs (3) to which no external video source (S1, S2) is connected are displayed on the source list (L) so as to be visually discernible from the source inputs (3) to which an external video source (S1, S2) is connected. Thus, only the external video sources (S11, S12, S13, . . . ), that are connected and that can be switched to without stopping the recording process, are easily determined.

In an embodiment of the present invention, while the recording process continues, the control unit (7) allows that only the external video sources (S11, S12, S13, . . . ) which are AV sources can be switched to.

In different embodiments of the present invention, the video recording device (1) is a digital television or a set-top box (STB).

By means of the present invention, the source switching process is enabled to be easily performed while the recording process is performed. Moreover, the risk of the recording process being unintentionally stopped is eliminated.

The invention claimed is:

1. A video recording device comprising:
    at least one receiver that receives digital broadcast signals that belong to more than one channel,
    more than one source input that enables external video sources to be connected,
    a display for displaying input from the more than one source input;
    an interface unit that enables a source list, where the receiver and the source inputs are listed, to be displayed by means of the display,
    a recording unit that enables the digital broadcast signal received by means of the receiver to be recorded,
    a memory wherein recorded content is stored, and
    a control unit configured to:
        allow that at least some of the external video sources connected to the source inputs can be switched to provide input to the display while the recording unit continues a recording process from a first source, and
        display the source list while the recording process continues, wherein external video sources that can be switched to provide input to the display without stopping the recording process are displayed on the source list to be visually discernible from external video sources that cannot be switched to provide input to the display without stopping the recording process, and wherein the external video sources that can be switched to without stopping the recording process include the first source along with an indicator identifying the first source as source of the recording process.

2. A video recording device as in claim 1, wherein the control unit is further configured to allow, when an external video source is desired to be switched to while the recording process continues, that only the external video sources that can be switched to without stopping the recording process, are switched to.

3. A video recording device as in claim 2, wherein the control unit is further configured to display a message that the external video sources that cannot be switched to without stopping the recording process cannot be switched to due to the recording process when an external video source that can be switched to without stopping the recording process is switched to while the recording process continues.

4. A video recording device as in claim 3, wherein the control unit is further configured to provide the displaying of a message indicating that the recording process is being performed in the vicinity of the receiver when the source list is displayed while the recording process continues.

5. A video recording device as in claim 4, wherein the control unit is further configured to enable:
    when the source list is displayed while the recording process continues, the external video sources that can be switched to without stopping the recording process to be displayed at the top of the source list one after the other such that no other external video source is placed therebetween, and
    when the source list is displayed while the recording process continues, the external video sources that can be switched to without stopping the recording process to be displayed in the source list in a color different from that of the external video sources that cannot be switched to without stopping the recording process, and
    when the source list is displayed while the recording process continues, the external video sources that can be switched to without stopping the recording process to be displayed in the source list with a font and/or size different from that of the external video sources that cannot be switched to without stopping the recording process.

6. A video recording device as in claim 5, wherein the control unit is further configured to assure that the source inputs to which no external video source is connected are displayed on the source list so as to be visually discernible from the source inputs to which an external video source is connected and the control unit that allows that only the external video sources which are AV sources can be switched to while the recording process continues.

7. A video recording device as in claim 1, wherein the control unit is further configured to display a message that the recording process will be stopped if switching process is continued when an external video source that cannot be switched to without stopping the recording process is desired to be switched to while the recording process continues.

8. A video recording device as in claim 7, wherein the control unit is further configured to enable:
    when the source list is displayed while the recording process continues, the external video sources that can be switched to without stopping the recording process to be displayed at the top of the source list one after the other such that no other external video source is placed therebetween, and
    when the source list is displayed while the recording process continues, the external video sources that can be switched to without stopping the recording process to be displayed in the source list in a color different from that of the external video sources that cannot be switched to without stopping the recording process, and
    when the source list is displayed while the recording process continues, the external video sources that can be switched to without stopping the recording process to be displayed in the source list with a font and/or size different from that of the external video sources that cannot be switched to without stopping the recording process.

9. A video recording device as in claim 8, wherein the control unit is further configured to assure that the source inputs to which no external video source is connected are displayed on the source list so as to be visually discernible from the source inputs to which an external video source is connected and the control unit that allows that only the external video sources which are AV sources can be switched to while the recording process continues.

10. A video recording device as in claim 1, wherein the control unit is further configured to provide the displaying of a message indicating that the recording process is being performed in vicinity of the receiver when the source list is displayed while the recording process continues.

11. A video recording device as in claim 1, wherein the control unit is further configured to enable, when the source list is displayed while the recording process continues, the external video sources that can be switched to without stopping the recording process to be displayed at top of the source list one after the other such that no other external video source is placed therebetween.

12. A video recording device as in claim 1, wherein the control unit is further configured to enable, when the source list is displayed while the recording process continues, the external video sources that can be switched to without stopping the recording process to be displayed in the source list in a color different from that of the external video sources that cannot be switched to without stopping the recording process.

13. A video recording device as in claim 1, wherein the control unit is further configured to enable, when the source list is displayed while the recording process continues, the external video sources that can be switched to without stopping the recording process to be displayed in the source list with a font and/or size different from that of the external video sources that cannot be switched to without stopping the recording process.

14. A video recording device as in claim 1, wherein the control unit is further configured to assure that the source inputs to which no external video source is connected are displayed on the source list so as to be visually discernible from the source inputs to which an external video source is connected.

15. A video recording device as in claim 1, wherein the control unit is further configured to allow that only the external video sources which are AV sources can be switched to while the recording process continues.

16. A video recording device as in claim 1, which is a digital television.

17. A video recording device as in claim 1, which is a set-top box (STB).

* * * * *